(12) United States Patent
Li et al.

(10) Patent No.: US 9,576,914 B2
(45) Date of Patent: Feb. 21, 2017

(54) INDUCING DEVICE VARIATION FOR SECURITY APPLICATIONS

(71) Applicant: GLOBALFOUNDRIES Inc., Grand Cayman (KY)

(72) Inventors: Wai-Kin Li, Hopewell Junction, NY (US); Chengwen Pei, Danbury, CT (US); Ping-Chuan Wang, Hopewell Junction, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/707,442

(22) Filed: May 8, 2015

(65) Prior Publication Data

US 2016/0329287 A1 Nov. 10, 2016

(51) Int. Cl.
| | | |
|---|---|---|
| H01L 27/088 | (2006.01) | |
| H01L 23/00 | (2006.01) | |
| H01L 29/06 | (2006.01) | |
| H01L 29/10 | (2006.01) | |
| H01L 29/66 | (2006.01) | |
| H01L 27/02 | (2006.01) | |

(52) U.S. Cl.
CPC .......... *H01L 23/576* (2013.01); *H01L 27/0207* (2013.01); *H01L 27/088* (2013.01); *H01L 29/0653* (2013.01); *H01L 29/1033* (2013.01); *H01L 29/66537* (2013.01)

(58) Field of Classification Search
CPC .......... G06F 21/71; G06F 21/73; G06F 7/588; H01L 23/576; H01L 27/0207; H01L 27/088; H01L 29/0653; H01L 29/1033; H01L 29/66537

USPC ............. 257/392, 1, 379, 371; 438/217, 414
See application file for complete search history.

(56) References Cited

U.S. PATENT DOCUMENTS

| | | |
|---|---|---|
| 7,757,083 B2 | 7/2010 | Devadas et al. |
| 8,028,924 B2 | 10/2011 | Anderson et al. |
| 8,379,856 B2 | 2/2013 | Potkonjak |
| 8,525,549 B1 | 9/2013 | Feng et al. |
| 8,619,979 B2 | 12/2013 | Ficke et al. |
| 8,741,713 B2 | 6/2014 | Bruley et al. |

(Continued)

OTHER PUBLICATIONS

Kalyanaraman et al., "Novel Strong PUF based on Nonlinearity of MOSFET Subthreshold Operation", 2013 IEEE International Symposium on Hardware-Oriented Security and Trust (HOST), pp. 13-18.

(Continued)

*Primary Examiner* — Mohammed Shamsuzzaman
(74) *Attorney, Agent, or Firm* — Heslin Rothenberg Farley & Mesiti P.C.; George Blasiak

(57) ABSTRACT

A Physical Unclonable Function (PUF) semiconductor device includes a semiconductor substrate, and regions, with implant regions and covered regions, in the semiconductor substrate. A hardmask covers a first covered region and a second covered. The first implant region having a first concentration of ions, and at least one second implant region having a second concentration that is less than the first concentration. First and second FETs are formed on the regions. The first and second FETs have a voltage threshold mismatch with respect to one another based on the first region and the at least one second region.

10 Claims, 5 Drawing Sheets

(56) References Cited

U.S. PATENT DOCUMENTS

| | | | |
|---|---|---|---|
| 2002/0017640 A1* | 2/2002 | Masuoka | H01L 21/26513 257/1 |
| 2003/0181004 A1* | 9/2003 | Watt | H01L 21/823807 438/217 |
| 2005/0095804 A1* | 5/2005 | Dietz | H01L 21/2253 438/414 |
| 2006/0108641 A1* | 5/2006 | Jong | H01L 21/26513 257/371 |
| 2010/0322418 A1 | 12/2010 | Potkonjak | |
| 2011/0163088 A1 | 7/2011 | Besling et al. | |
| 2011/0254141 A1 | 10/2011 | Roest et al. | |
| 2012/0299115 A1* | 11/2012 | Chuang | H01L 21/31055 257/379 |
| 2013/0233608 A1 | 9/2013 | Feng et al. | |
| 2013/0322617 A1 | 12/2013 | Orshansky | |
| 2015/0084193 A1 | 3/2015 | Feng et al. | |

OTHER PUBLICATIONS

Forte et al., "Improving the Quality of Delay-Based PUFs via Optical Proximity Correction", IEEE Transactions on Compter-Aided Design of Integrated Circuits and Systems, vol. 32, No. 12, Dec. 2013, pp. 1879-1891.

Zhang et al., "Highly Stable Data SRAM-PUF in 65nm CMOS Process", 2013 IEEE, pp. 1-4.

Johnson, "The Navy Bought Fake Chinese Microchips That Could Have Disarmed U.S. Missiles", Business Insider, Jun. 27, 2011, pp. 1-2, http://www.businessinsider.com/navy-chinese-microchips-weapons-could-have-been-shutoff-2011-6.

Alkabani et al., "Trusted Integrated Circuits: A Nondestructive Hidden Characteristics Extraction Approach", LNCS 5284, pp. 102-117, 2008.

Su et al., "A 1.6pJ/bit 96% Stable Chip-ID Generating Circuit using Process Variations", Feb. 14, 2007 IEEE International Solid-State Circuits Conference, Session 22, Digital Circuit Innovations, 22.5, pp. 406-407 and 611.

Guajardo et al., "Physical Unclonable Functions and Public-Key Crypto for FPGA IP Protection", 2007 IEEE, pp. 189-195.

Gassend et al., "Controlled Physical Random Functions and Applications", ACM Transactions on Information Systems and Security, vol. 10, No. 4, Article 15, Pub. date: Jan. 2008, pp. 1-22.

Pending U.S. Appl. No. 14/158,917, filed Jan. 20, 2014, entitled: "Semiconductor Device Including Enhanced Variability", pp. 1-24.

Pending U.S. Appl. No. 14/096,345, filed Dec. 4, 2013, entitled: "On-Chip Structure for Security Application", pp. 1-64.

\* cited by examiner

INDUCING DEVICE VARIATION FOR SECURITY APPLICATIONS

BACKGROUND

The present invention relates generally to the field of security infrastructure and more particularly to a semiconductor device including enhanced variability and physical unclonable functionality (PUF).

Electronics may use integrated circuits (IC) using, for example, a substrate and additives to form a solid-state electronic device. Device variability during manufacture may hinder proper function, however, such manufacture variability may be utilized to enforce security information technology physically on an IC.

An integrated circuit (IC) is an electronic circuit which can be formed using silicon as a substrate and by adding impurities to form solid-state electronic devices, such as transistors, diodes, and resistors. Commonly known as a "chip," an integrated circuit is generally encased in hard plastic, forming a "package." Often, many such packages are electrically coupled so that the chips therein form an electronic circuit to perform certain functions.

During the IC manufacture process, radiation is focused through the mask and at certain desired intensity of the radiation. This intensity of the radiation is commonly referred to as "dosing" or "doping." The focus and the doping of the radiation have to be precisely controlled to achieve the desired shape and electrical characteristics on the wafer.

Security of internet related circuitry and applications is needed to protect information within a networked, cloud, or internet environment. Various methods of securing data have been used, for example, Physical Unclonable Function (PUF). PUF is a physical encoding onto a chips in order to avoid cloning. Typically, a PUF is a function that is embodied in a physical structure and is easy to evaluate but hard to predict. Applications of PUF include challenge-response authentication, where access depends on providing correct responses to challenges, and the challenge-response pairs are generated by a PUF.

SUMMARY

Aspects of the present invention provide a semiconductor device and method for implementing a physical unclonable function (PUF) utilizing variability in manufacturing.

In an aspect of the invention, a semiconductor device includes a substrate, the substrate having a first region and a second region. Each region includes an implant region and a covered region. The two implant regions have a first width and second width respectively. Each implant region has a different width. A shallow trench isolation (STI) is located in the substrate. The STI is in-between the first and second region being on adjacent sides of the first region and adjacent sides of the second region. A patterned mask is formed on the first covered region and on the second covered region. A first implant well, or dopant region, and a second implant well, or dopant region, are located in the first and second implant regions respectively. The dopant regions are annealed allowing the first and second implant and covered regions have a uniform dopant concentration. A device is placed on the first region and the second.

In another aspect of the invention, a method of forming a semiconductor device includes forming a patterned mask on a substrate. A patterned mask is formed with a window exposing the first implant region and a window exposing the second implant region. The mask is removed and the implant wells are annealed. A device is placed on each implant region, where the device is a metal-oxide-semiconductor field-effect transistor (MOSFET) device.

DETAILED DESCRIPTION

Figure 1:
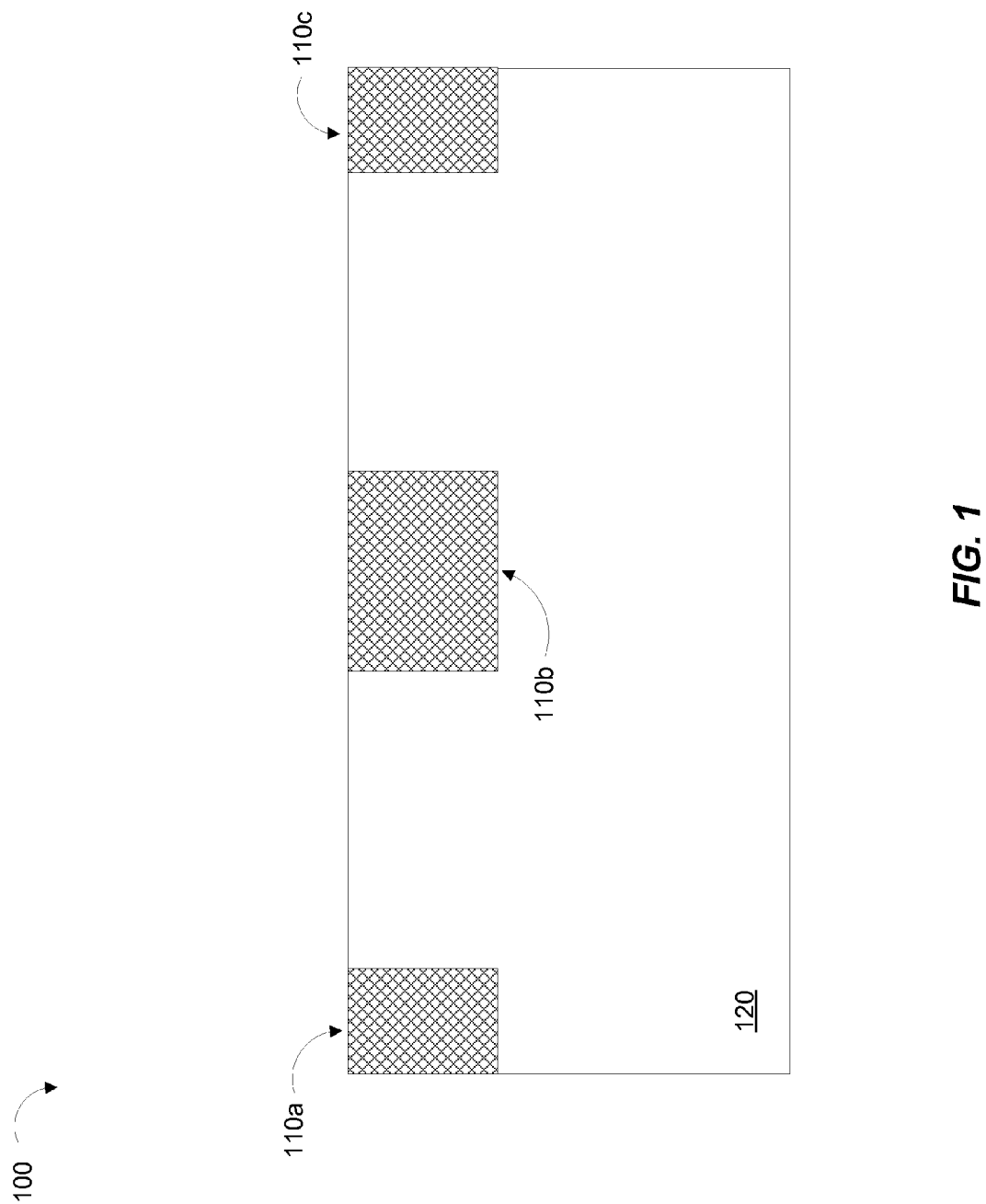
FIG. 1 depicts a cross-section of a modified wafer, in accordance with an illustrative embodiment.

Exemplary embodiments of the present invention will now be described in detail with reference to the accompanying drawings. However, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of this disclosure. It will be understood that when an element as a layer or region, is referred to as being "on" or "over", "disposed on", "disposed over", "deposited on", or "deposited over" another element, it can be directly on the other element or intervening elements may also be present. In contrast, when an element is referred to as being "directly on", "directly over", or "disposed proximately to" another element, there are no intervening elements present. Furthermore, it will be understood that when an element as a layer or region is referred to as being "adjacent to" or "disposed adjacent to" another element, it can be directly adjacent to the other element or intervening elements may be present.

A physical unclonable function (PUF) of the illustrative embodiments is a function that is embodied in a physical structure, such as a hardware circuit in an IC chip. Particularly, within the scope of the illustrative embodiments, a fabrication process fabricates a PUF circuit in or together with the fabrication of another circuit on a wafer.

The PUF circuit of the illustrative embodiments comprises one or more PUF cells. The function embodied in PUF evaluates to a particular value. A PUF cell comprises a hardware circuit that operates to provide all or part of the PUF value.

According to the illustrative embodiments, the value of the PUF is random from one implementation to another in that different instances of the same PUF circuit fabricated using the same PUF cell design and the same fabrication process can evaluate to different values. Thus, even if the design of the PUF circuit, the PUF cells, and the method used to fabricate the PUF cells are all known, another implementation or another fabrication of the same PUF circuit will result in a randomly different value.

Furthermore, according to the illustrative embodiments, the value to which a PUF circuit evaluates is stable. In other words, once fabricated, a PUF circuit according to an embodiment will result in the same value under normal operating conditions expected for the IC in which the PUF circuit is fabricated. Thus, a PUF value according to the illustrative embodiments is random between different instances of the same PUF circuit, unpredictable even with the knowledge of the PUF function design, and stable during the operation of the PUF circuit.

A large device, MOSFET is more stable than smaller devices. Utilizing a large device may prevent threshold voltage deterioration over time with respect to smaller devices. Threshold voltage, or Vt, represents values over an IC that may from different voltages over a pair of PUF cells. This stability is desirable as stable voltage over the IC may provide a stable output. Another advantage of the use of large MOSFET device there may be no need for amplification of the voltage, amplification may deteriorate randomness.

A method for manufacturing a semiconductor device according to an exemplary embodiment of the invention is shown in FIGS. 1 through 5. FIGS. 1 through 5, illustrate an exemplary process flow for the fabrication of a large metal-oxide-semiconductor field-effect transistor (MOSFET) Physical Unclonable Function (PUF) device. FIG. 1 illustrates a cross-sectional of a modified wafer 100 including a substrate 120 and Shallow Trench Insulators (STI's) 110. The substrate 120 may have two regions on either side of the STI 110b.

The substrate 120 may be formed from a semiconductor material. For example, the substrate 120 may include, but is not limited to, a material or a combination of materials: silicon, silicon germanium, silicon carbide, silicon dioxide, aluminum oxide, sapphire, germanium, gallium arsenide, an alloy of silicon and germanium, or indium phosphide. The substrate 120 may also be made from other materials. The substrate 120 may also be formed by stacking a plurality of layers as desired. For example, the substrate 120 may include an insulating layer and a semiconductor layer located on the insulating layer, thereby forming a so-called silicon on insulator (SOI) substrate.

A silicon oxide insulating layer may be implanted as STI's 110. A silicon oxide STI, for example, STI's 110, is only an example of achieving electrical isolation between various cells in a wafer. The STI's 110 may be formed by, for example, patterning a shallow trench within the substrate 120 and filling the shallow trench with a dielectric material, such as, for example, silicon oxide and/or silicon nitride.

The shallow trench may be formed, for example, by applying and patterning a photoresist, then transferring (i.e., etching) the photoresist pattern through the wafer. After removal of the photoresist, a dielectric material may be deposited and subsequently planarized to form the STI's 110b. The top surface of the STI 110b may be coplanar with a top surface of the substrate 120. An optional trench liner may be formed within the shallow trench prior to filling the shallow trench with a dielectric material.

Figure 2:
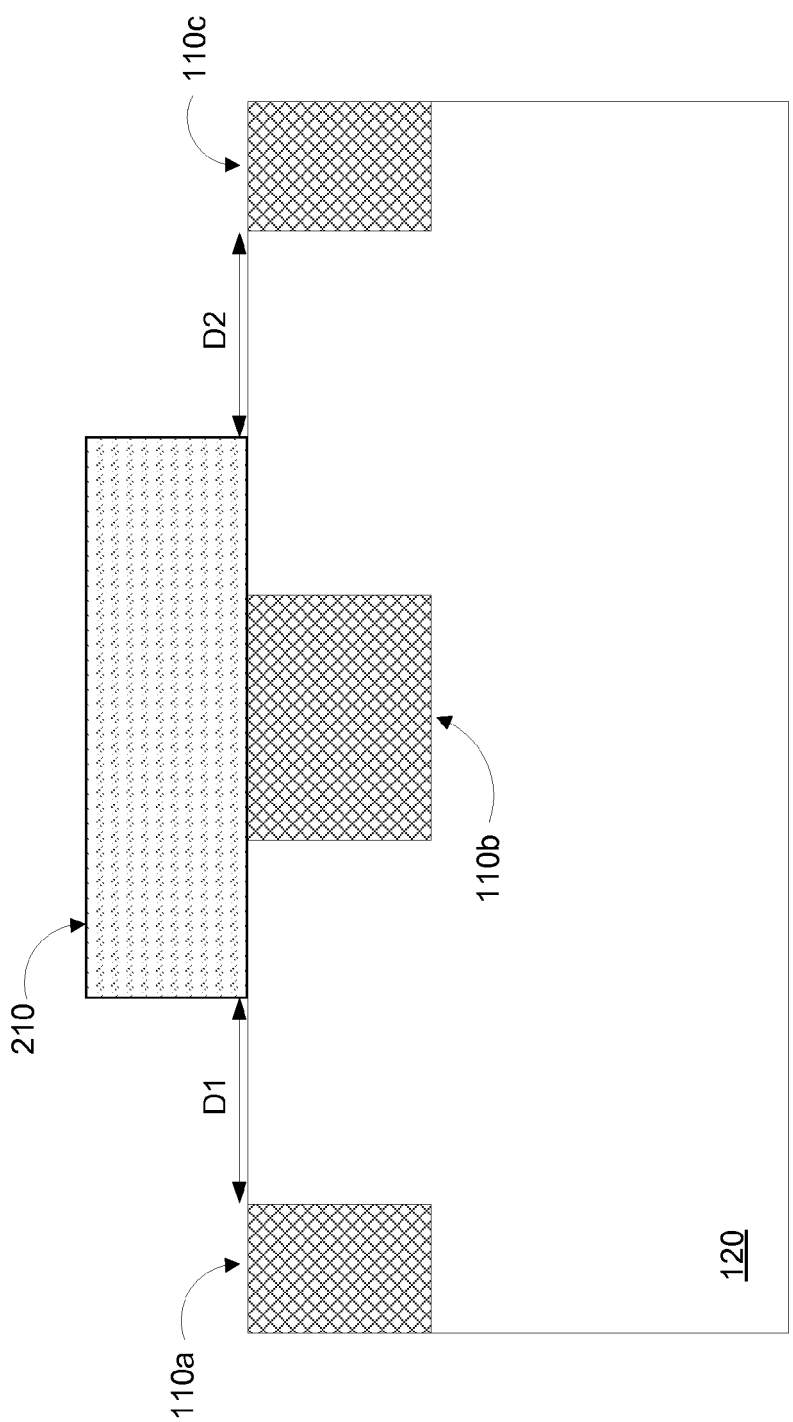
FIG. 2 depicts a cross-section of a further modified wafer of FIG. 1 including a mask, in accordance with an illustrative embodiment.

Referring to FIG. 2, the modified wafer 100 shown in FIG. 1 is further modified including a patterned hardmask 210, in accordance with an illustrative embodiment. In one example, a hardmask 210 is positioned using a first distance (D1) and a second distance (D2). The hardmask 210 is depicted after etching of a pattern onto the hardmask layer to expose a portion of the two regions on either side of the STI 110b. Possible etching technologies may include, but are not limited to, reactive ion etching (RIE), anisotropic RIE, isotropic RIE, wet etching, plasma etching, or ion milling.

In an exemplary embodiment of the present invention, the hardmask 210 may be formed and placed on the modified wafer 100. In the process of the placement of hardmask 210 there may be random variations in the location of the placement of hardmask 210 that may cause hardmask 210 to deviate from a central placement in relation to STI 110b. This random variation in the placement of hardmask 210 will result in distances D1 and D2 not being equivalent. During manufacture, the random variation of the placement of hardmask 210 may create D1 that is as greater than D2 or D1 that is less than D2.

The hardmask 210 may also be deposited using typical deposition techniques, for example, atomic layer deposition (ALD), molecular layer deposition (MLD), chemical vapor deposition (CVD), physical vapor deposition (PVD), and spin on techniques. The hardmask 210 may include any photolithographic masking material known in the art, for example, a nitride. The hardmask 210 may have a thickness ranging from about 5 nm to about 30 nm and ranges there between, although a thickness less than 5 nm and greater than 30 nm may be acceptable.

In another embodiment of the present invention the hardmask 210 may be etched using a typical etching technique described above that may expose a portion of the regions on either side of STI 110b via windows etched in the patterned mask. Random fabrication variations in the etching process may result in distance D1 and distance D2 being dissimilar as described above.

Figure 3:
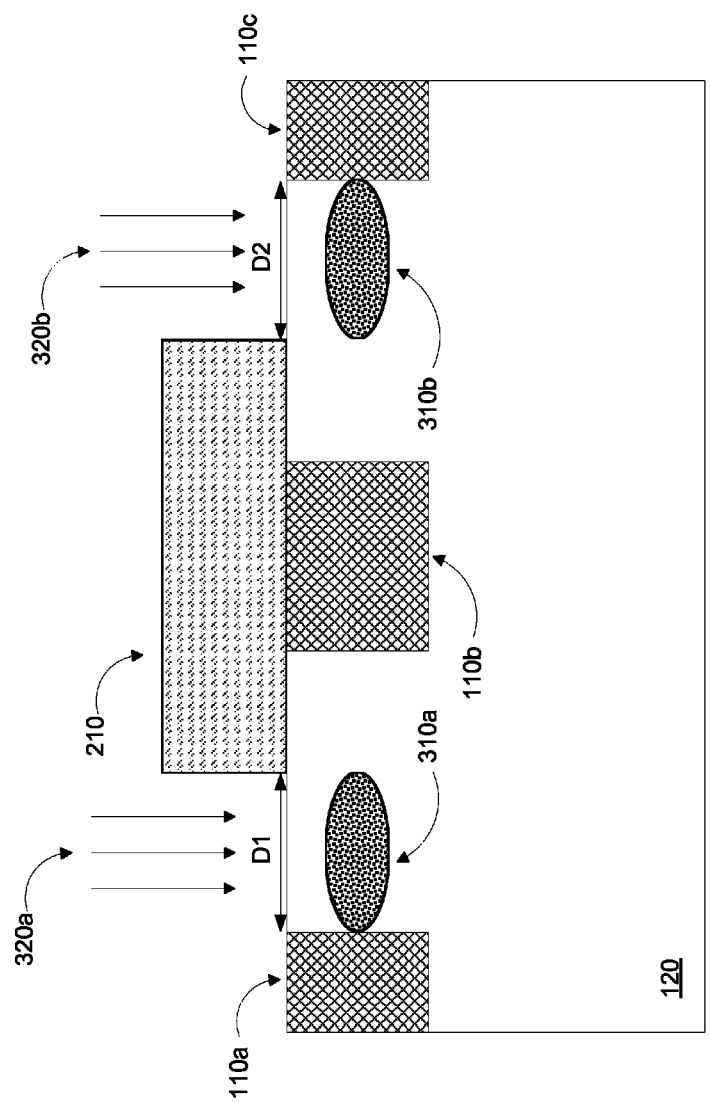
FIG. 3 depicts a cross-section of a further modified wafer of FIG. 2 including a mask and ion doping, in accordance with an illustrative embodiment.

Referring to FIG. 3, the modified wafer shown in FIG. 2 includes a mask and ion doping, in accordance with an illustrative embodiment. Dopants 320 are shown radiating onto implant regions, or dopant regions 310. Ion implantation may be used to introduce dopants 320 to dopant regions 310 of the substrate 120. In various embodiments, different implantation techniques may using including, but not limited to, ion implantation, gas phase doping, plasma doping, plasma immersion ion implantation, cluster doping, infusion doping, liquid phase doping, solid phase doping, or any suitable combination of those techniques. In the present embodiment, the dopant may be implanted into a top surface of the substrate 120 within the dopant regions 310. In various embodiments, the dopant used to implant dopant regions 310 may include arsenic, and the implant technique may simultaneously implant both dopant regions 310.

In an embodiment of the present invention, the hardmask 210 blocks a portion of the dopant and allows a portion of the dopants 320 into dopant regions 310. As described in FIG. 2 above, the variation of the placement of hardmask 210 creates a width D1 that may be greater than the width D2 or width D1 that is less than the width D2. This may result in a greater or smaller concentration of dopant respectively, in dopant regions 310, proportional to the width of D1 or D2. For example, a random variation in the placement of hardmask 210 results in the width of D1 being greater than the width of D2, the resulting concentration of dopant in dopant region 310a will be greater than the concentration of dopant in dopant region 310b.

Figure 4:
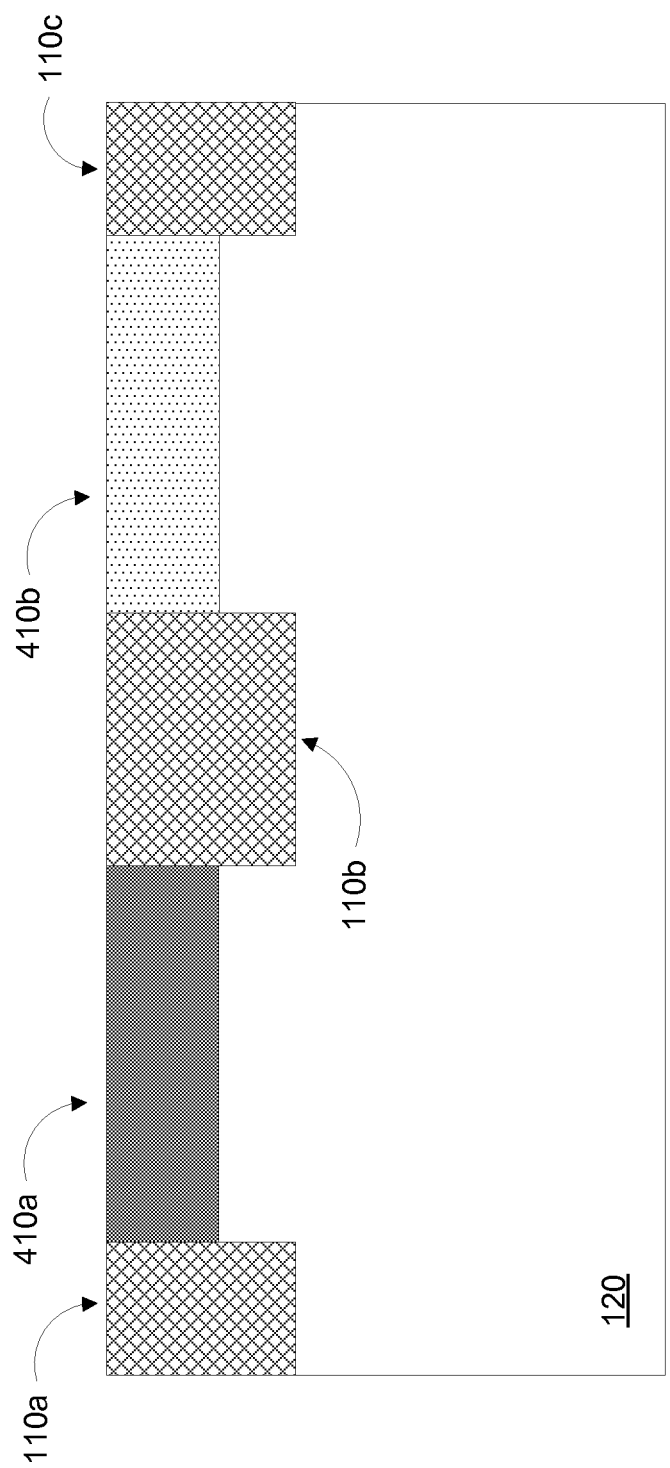
FIG. 4 depicts a cross-section of a further modified wafer of FIG. 3 including annealed wells, in accordance with an illustrative embodiment.

FIG. 4 depicts a cross-section of a further modified wafer 100 of FIG. 3 including annealed implant wells, in accordance with an illustrative embodiment. In reference to FIGS. 3 and 4, the implant wells, for example, dopant regions 310, may experience one or more thermal processes including increase temperatures, for example an activation annealing technique. These thermal processes may encourage the diffusion of the implanted ions, for example the dopants 320, in the dopant regions 310, forming annealed regions 410. These thermal processes may affect the concentration and depth of the dopant thus affecting the concentration and depth of annealed regions 410. Any subsequent thermal process or annealing technique may have little if any affect in the function of the dopant within annealed regions 410.

In an embodiment of the present invention, annealed regions 410 may have different concentrations of dopants 320, for example, after the completion of the activation annealing. In an exemplary embodiment, the difference in concentration of dopant in annealed regions 410 may be a result of the random variation in the placement of hardmask 210 and the difference in concentration of dopant in the dopant regions 310, as described in reference to FIG. 3 above. This may result in a difference in the dopant concentration in annealed region 410a with respect to annealed region 410b. For example, a random variation in the placement of hardmask 210 results in the width of D1 being greater than the width of D2, the resulting concentration of dopant in dopant region 310a will be greater than the concentration of dopant in dopant region 310b. Therefore, after annealing, annealed region 410a will have a greater dopant concentration than annealed region 410b.

Figure 5:
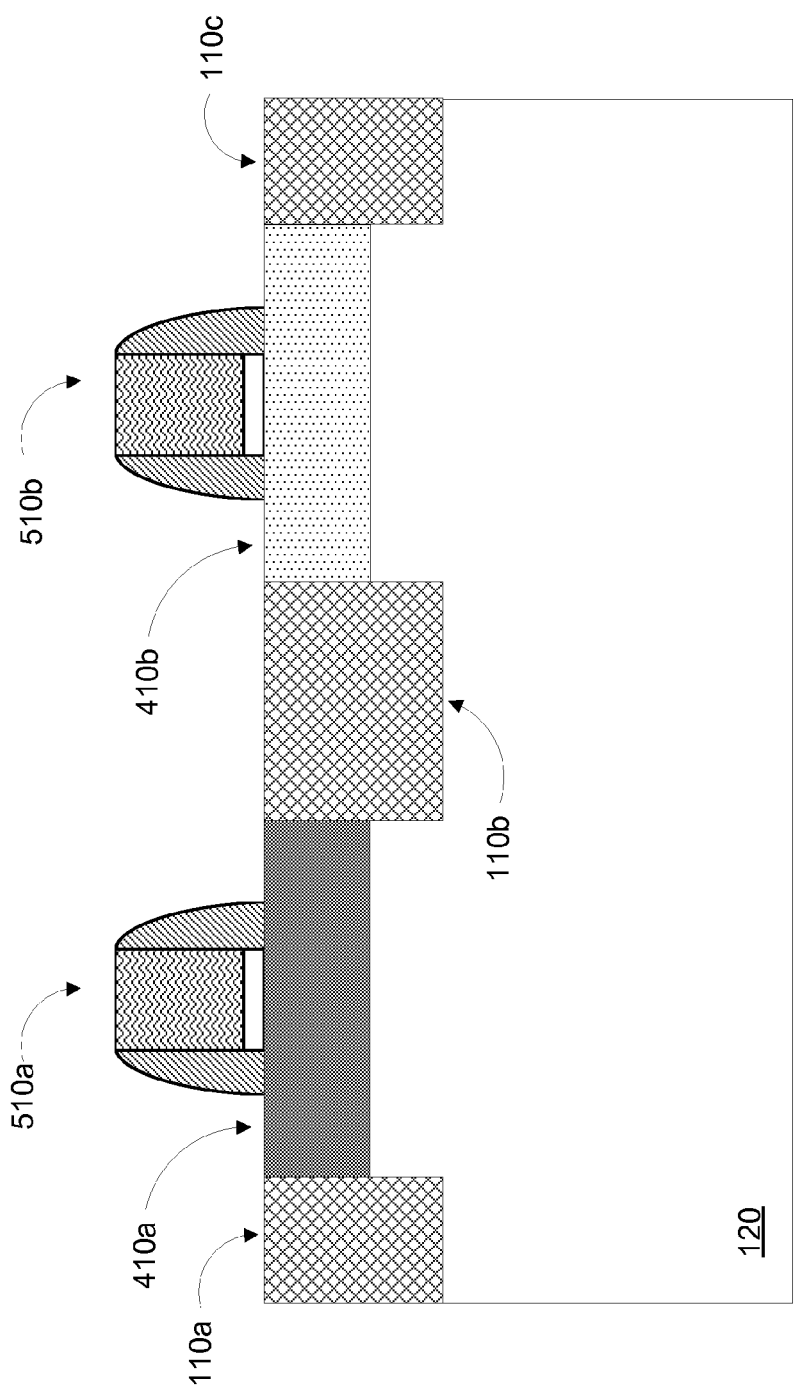
FIG. 5 depicts a cross-section of a further modified wafer of FIG. 4 including channel gates, in accordance with an illustrative embodiment.

With reference to FIG. 5, FIG. 5 depicts a cross-section of a further modified wafer 100 of FIG. 4 including channel gates, in accordance with an illustrative embodiment. One or more devices, for example n FETs 510, may be formed on the regions on either side of STI 110b, for example, annealed regions 410. The n FETs 510 may have a voltage threshold (Vt) mismatch with respect to one another based on the difference in the dopant concentration of annealed region 410a with respect to annealed region 410b. For example, if the dopant concentration of annealed region 410a is greater than the dopant concentration of annealed region 410b, there may be a voltage mismatch as the n FET 510a may have a greater Vt than n FET 510b.

The n FETs 510 may be fabricated using any technique known in the art, for example, gate first or gate last techniques. Furthermore, the devices may include either a planar structure or a fin structure as is well known in the art. In the case of planar devices, as shown, the n FETs 510 may include a gate formed on top of the annealed regions 410. The gate may further include a pair of dielectric spacers formed by conformally depositing a dielectric, followed by an anisotropic etch that removes the dielectric from the horizontal surfaces of the modified wafer 100 while leaving it on the sidewalls of the gate. The n FETs 510 may each include a source region and a drain region formed in the annealed regions 410 using any implant technique known in the art. The source and drain regions may be formed from doped implant wells, or dopant regions 310, as described above.

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A method of forming a Physically Unclonable Function (PUF) semiconductor device, the method comprising:
   defining a first and second region on a substrate, the first region includes a first implant region and a first covered region subject to being covered, the second region includes a second implant region and a second covered region subject to being covered, the first implant region has a first width, the second implant region has a second width, and the first width is greater than the second width;
   forming a shallow trench isolation (STI) in the substrate, wherein the STI is on adjacent sides of the first region and adjacent sides of the second region;
   forming a patterned mask on the first covered region and on the second covered region;
   forming a first implant well in the first implant region and a second implant well in the second implant region;
   annealing the first implant well and the second implant well, wherein the first implant region and the first covered region have a first uniform dopant concentration, and the second implant region and the second covered region have a second uniform dopant concentration, wherein the first uniform dopant concentration is greater than the second uniform dopant concentration;
   forming a first device on the first region and a second device on the second region, wherein the method is performed so that a difference in the first uniform doping concentration and the second uniform doping concentration varies in dependence on a difference between the first width and the second width; and
   wherein the method is performed so that random variation in the method of forming the semiconductor device results in the first implant region having the first width, and the second implant region having the second width.

2. The method of claim 1, wherein the first region and the second region are separated by the STI.

3. The method of claim 1, wherein forming the patterned mask further comprises:
   forming a mask layer covering an entirety of the first region and an entirety of the second region; and
   removing a portion of the mask layer from above the first implant region and the second implant region, wherein the patterned mask is a portion of the mask layer remaining on the first covered region and on the second covered region.

4. The method of claim 1, further comprising:
   removing the patterned mask from above the first covered region and the second covered region.

5. The method of claim 1, wherein the first implant region has a different dopant concentration than the first covered region and the second implant region has a different dopant concentration than the second covered region.

6. The method of claim 1, wherein the first implant well is formed using ion implementation.

7. The method of claim 1, wherein the first device on the first region is a metal-oxide-semiconductor field-effect transistor (MOSFET) device and the second device on the second region is a MOSFET device.

8. The method of claim 1, wherein the first device has a greater threshold voltage value than a threshold voltage value of the second device.

9. The method of claim 1, wherein the random variation includes random variation in a placement of the patterned mask.

10. The method of claim 1, wherein the random variation includes random variation in an etching of the patterned mask.

* * * * *